EARPHONE

Filed March 23, 1945

Inventor
Charles M. R. Balbi
By D. Malcolm
Attorney

UNITED STATES PATENT OFFICE 2,528,811

EARPHONE

Charles M. R. Balbi, London, England

Application March 23, 1945, Serial No. 584,272

In Great Britain April 1, 1944

3 Claims. (Cl. 179—107)

This invention relates to telephone receivers and more particularly to a miniature telephone receiver or earphone of the kind which is supported within the pinna of the ear, as for example in the case of a telephone receiver forming part of what is generally termed a deaf-aid.

Miniature receivers of this kind have hitherto consisted of a solid ear plug which is in general shaped to conform to the convolutions of the pinna and the auditory meatus and which is provided with a passage extending therethrough so as to open into said meatus. In operation the air column within the passage of the ear plug is set in vibration by means such as an electromagnetic telephone unit which is supported on the external face of the plug.

The primary object of the present invention is to provide a telephone receiver of the above kind which is light in weight, is inconspicuous, is not readily dislodged by normal head movements, has no orifice which is subject to blockage due to wax and can be soaked in disinfectant and dried by wiping the surface with a clean rag.

A further object of the invention is to provide a miniature telephone receiver which is of simplified construction.

According to the present invention a telephone receiver of the above character includes a hollow shell member acting wholly or in part as a vibratory diaphragm.

The device of the invention preferably comprises a concavo-convex shell member having its convex surface shaped to conform to at least the major concave portion of the pinna of the ear and an electro-acoustic transducer disposed wholly or in part within the interior of the shell member and coupled to said shell.

The invention will be hereinafter more particularly described with reference to the accompanying drawing, in which.

Figure 1:
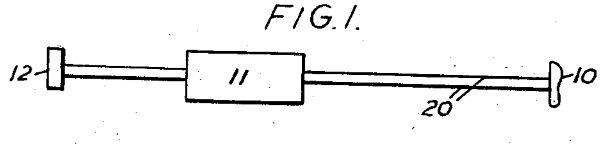
Figure 1 shows a diagrammatic lay-out of a deaf-aid device incorporating the miniature receiver constructed according to the invention.

Referring to Figure 1, a miniature receiver denoted generally by 10 is connected to an amplifying device 11 which in turn is electrically connected to a transmitting microphone 12. The construction of the amplifier 11 and microphone 12 forms no part of the present invention and will not be more fully described herein. It is sufficient to state that in accordance with normal practice acoustic vibrations impinging on the microphone diaphragm produce current oscillations from a battery forming part of the amplifier 11, which oscillations are amplified in said amplifier and are supplied through suitable electric conductors 20 connected to the vibrator unit of the receiver 10.

Figure 2:
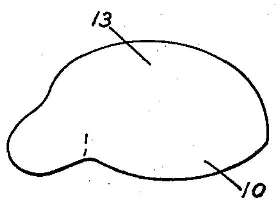
Figure 2 shows a perspective view of the receiver.

As shown in Figure 2, the miniature telephone receiver comprises a concavo-convex shell member, the convex surface 13 of which is so shaped as to fit snugly within at least the major concave portion of the pinna of the ear. The shell of the receiver 10 is hollow and contains an electro-acoustic transducer which may be of varied construction.

Figure 3:
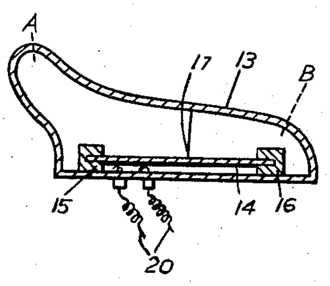
Figure 3 shows a sectional view of a receiver containing a piezo-electric crystal.

As shown in Figure 3, which is a transverse section through the shell, a piezo-electric crystal 14 is mounted on suitable supports 15, 16 in turn carried by the inner face of the shell and the crystal 14 is coupled by a stud 17 or the like to the outer convex member 13 of the shell. The crystal is connected in the usual manner by leads 20 to the amplifying device 11.

In operation the vibrations produced by the crystal 14 are transmitted through the stud 17 to the convex member 13 of the shell which thus acts as a vibratory diaphragm. In this manner sound waves are generated in the air column present in the auditory meatus of the wearer.

If desired part only of the shell member 13 may form the diaphragm. For example, the portion of the member 13 lying between the limits A, B disposed for example in the central region of the shell nearest the auditory meatus, may comprise the diaphragm proper and this portion may either be moulded integrally with the shell or may be suitably attached thereto.

Figure 4:
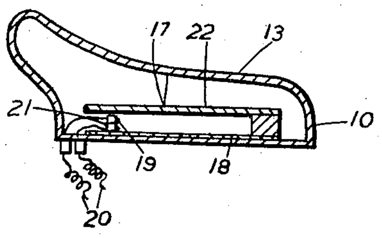
Figure 4 shows a corresponding view of a receiver containing an electro-magnetic vibrator.

In the embodiment shown in Figure 4 the piezo-electric crystal 14 is replaced by an electro-magnetic vibrator denoted generally by 18. This comprises a core member 19 around which is wound a small coil 21 while a vibrating pole piece 22 is disposed adjacent the core 19. Pole piece 22 is connected by a stud or the like 17 to the convex member 13 of the shell. As in the embodiment shown in Figure 3, part only of the member 13 may form the diaphragm to which the mechanical vibrations are imparted.

The shell member shown in Figure 3 may be formed of a light weight material coming within the general class of "plastics" and may readily be moulded to the desired shape. The piezo-electric crystal may comprise for example a Rochelle salt crystal unit known to those skilled in the art as a "bender." On the other hand the shell in the construction shown in Figure 4 may be formed of magnetic material so as to interact with the electrical transducer formed by the miniature electromagnet and pole piece system.

Figure 5:
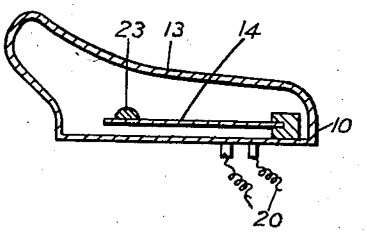
Figures 5 and 6 show transverse sections showing alternative methods of mounting the piezo-electric crystal and the electro-magnetic vibrator, respectively.
Figure 6:
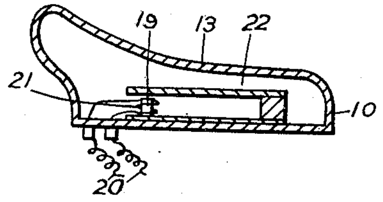

In the embodiment shown in Figure 5 a piezo-electric crystal 14 is secured at one end to the receiver shell 10, which shell in this embodiment acts as a whole as a vibratory diaphragm. If desired, the piezo-electric crystal 14 may be provided at its free end with a weight 23 which may be utilised for the control of frequency response. In a similar manner in the embodiment shown in Figure 6 the electrical transducer consisting of the miniature electro-magnetic pole piece system is mounted directly on the receiver shell 10 and the vibrations of the pole piece 22 produced by the coil 21 mounted on the core 19 are transmitted to the shell as a whole, which shell itself acts as the vibratory diaphragm.

The construction of the telephone receiver ear plug in the form of a hollow shell makes it possible to locate said receiver wholly within the major concave surface of the pinna of the ear. By the arrangement of the electro-acoustic transducer within the shell the center of gravity of the receiver may be arranged to lie within the pinna of the ear so that any turning moment acting on the ear plug receiver tending to dislodge the same from its position within the pinna is considerably reduced.

While the electro-acoustic transducer is described and shown as being disposed wholly within the interior of the shell member it is to be understood that the transducer may be disposed only partly within the interior cavity.

It is pointed out that since the vibratory diaphragm is in contact with the pinna, said diaphragm is heavily damped and as a result any tendency for audio feed-back from the telephone receiver 10 to the microphone system 12 used in conjunction therewith is reduced to a minimum.

What I claim and desire to secure by Letters Patent is:

1. An earphone adapted to be supported within the pinna of the ear comprising a closed casing shaped to conform to the pinna of the ear and including a vibratory wall which extends across the opening of the auditory meatus when the receiver is supported within the ear, and electrically operated means within said casing for vibrating said vibratory wall, the area of said vibratory wall being considerably larger than the opening in the meatus of the ear.

2. An earphone adapted to be supported within the pinna of the ear comprising a casing shaped to conform to the pinna of the ear and including a diaphragm wall which extends across the opening of the auditory meatus when the receiver is supported within the ear and is vibratory in a direction longitudinal of the meatus of the ear, and electrically operated means within said casing for vibrating said diaphragm wall, the vibratory area of said diaphragm wall being considerably larger than the opening in the meatus of the ear.

3. An earphone adapted to be supported within the pinna of the ear comprising a concavo-convex shell member having its convex surface shaped to conform to at least the major concave portion of the pinna of the ear, said shell member being composed of moulded plastic material and having only part thereof constituting a vibratory diaphragm, and an electro-acoustic transducer disposed at least in part within the interior of said shell member and having a vibratory element connected to said diaphragm for vibrating same.

CHARLES M. R. BALBI.

REFERENCES CITED

The following references are of record in the file of this patent:

UNITED STATES PATENTS

| Number | Name | Date |
|---|---|---|
| 1,328,620 | Lange et al. | Jan. 20, 1920 |
| 1,630,028 | Reynolds | May 24, 1927 |
| 1,733,579 | Coolbroth | Oct. 29, 1929 |
| 1,893,474 | Lieber | Jan. 3, 1933 |
| 2,045,427 | White | June 23, 1936 |
| 2,148,477 | Koch | Feb. 28, 1939 |
| 2,248,837 | Walters | July 8, 1941 |
| 2,391,924 | Rutter et al. | Jan. 1, 1946 |